United States Patent [19]
Foster, Sr.

[11] 3,930,544
[45] Jan. 6, 1976

[54] GARDEN IMPLEMENT

[76] Inventor: Lloyd Foster, Sr., Chopmist Hill Road, Box 61, Chepachet, R.I. 02814

[22] Filed: May 28, 1974

[21] Appl. No.: 473,418

[52] U.S. Cl. .......... 172/375; 56/400.06; 56/400.07; 56/400.21; 172/378; 172/381
[51] Int. Cl.²... A01B 1/10; A01B 1/12; A01D 7/06; A01D 7/10
[58] Field of Search .......................... 172/371–375, 172/378–381; 56/400.04–400.07, 400.01, 400.21

[56] References Cited
UNITED STATES PATENTS

| | | | |
|---|---|---|---|
| 84,231 | 11/1868 | Thacker | 56/400.07 |
| 197,956 | 12/1877 | Walker | 172/375 |
| 381,169 | 4/1888 | Rhodes | 172/375 |
| 816,320 | 3/1906 | Harris | 56/400.01 |
| 845,891 | 3/1907 | Prescott | 172/378 X |
| 1,120,062 | 12/1914 | Krabill | 56/400.06 |
| 1,213,230 | 1/1917 | Mittcousbe | 56/400.07 |
| 1,666,374 | 4/1928 | Gatti | 172/375 |
| 1,734,861 | 11/1929 | Knott | 56/400.05 |
| 1,847,587 | 3/1932 | Bartosz | 56/400.06 |
| 2,109,488 | 3/1938 | Wegner | 172/375 |
| 2,119,165 | 5/1938 | Hornstein | 172/378 X |
| 2,520,413 | 8/1950 | Kent | 172/375 X |
| 2,726,504 | 12/1955 | Paluska | 56/400.05 |
| 2,795,923 | 6/1957 | Kapuczin | 56/400.05 |
| 2,835,102 | 5/1958 | Blackhurst | 56/400.07 |
| 3,234,720 | 2/1966 | Blodgett | 56/400.05 |
| D139,367 | 11/1944 | Keller | 172/375 X |

FOREIGN PATENTS OR APPLICATIONS

| | | | |
|---|---|---|---|
| 18,759 | 4/1914 | Denmark | 56/400.21 |
| 878,734 | 10/1961 | United Kingdom | 56/400.01 |
| 15,005 | 12/1885 | United Kingdom | 56/400.06 |
| 937,961 | 9/1963 | United Kingdom | 172/380 |
| 560,133 | 3/1944 | United Kingdom | 172/375 |
| 480,110 | 2/1938 | United Kingdom | 56/400.06 |

*Primary Examiner*—Edgar S. Burr
*Assistant Examiner*—Steven A. Bratlie
*Attorney, Agent, or Firm*—Barlow & Barlow

[57] ABSTRACT

A garden cultivation implement equipped with a plurality of cutting edges for cutting and removing weeds or other undesired growth in the cultivation of a garden. Tines are also provided from the body of the cutter for use as a rake or cultivator and the outer edges of the implement are useful for hilling.

2 Claims, 8 Drawing Figures

U.S. Patent  Jan. 6, 1976  3,930,544
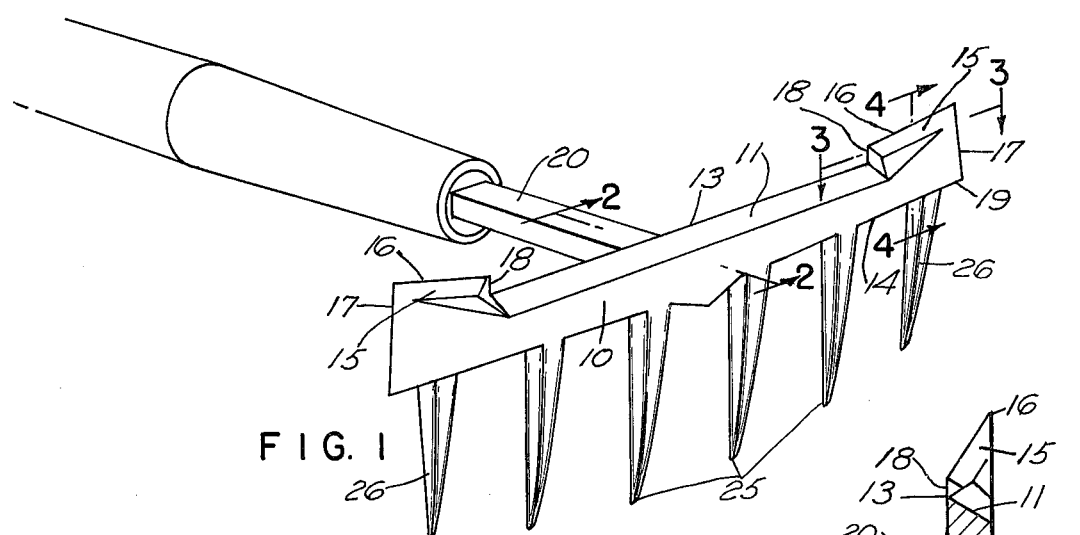
FIG. 1
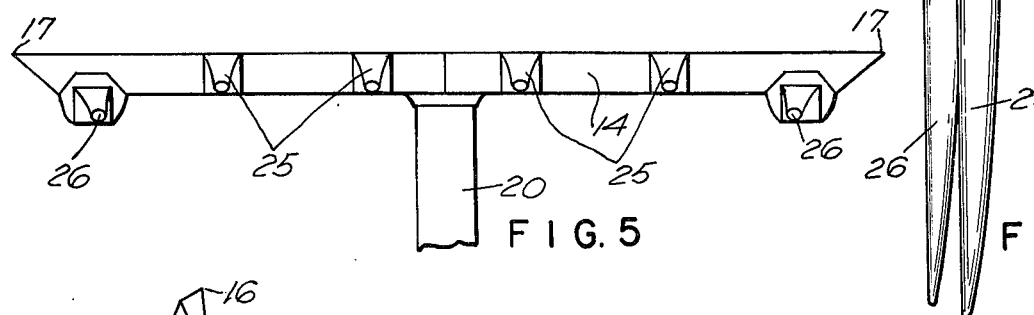
FIG. 5    FIG. 2
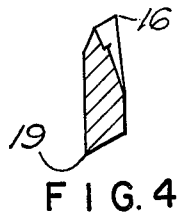
FIG. 4
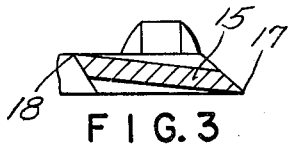
FIG. 3
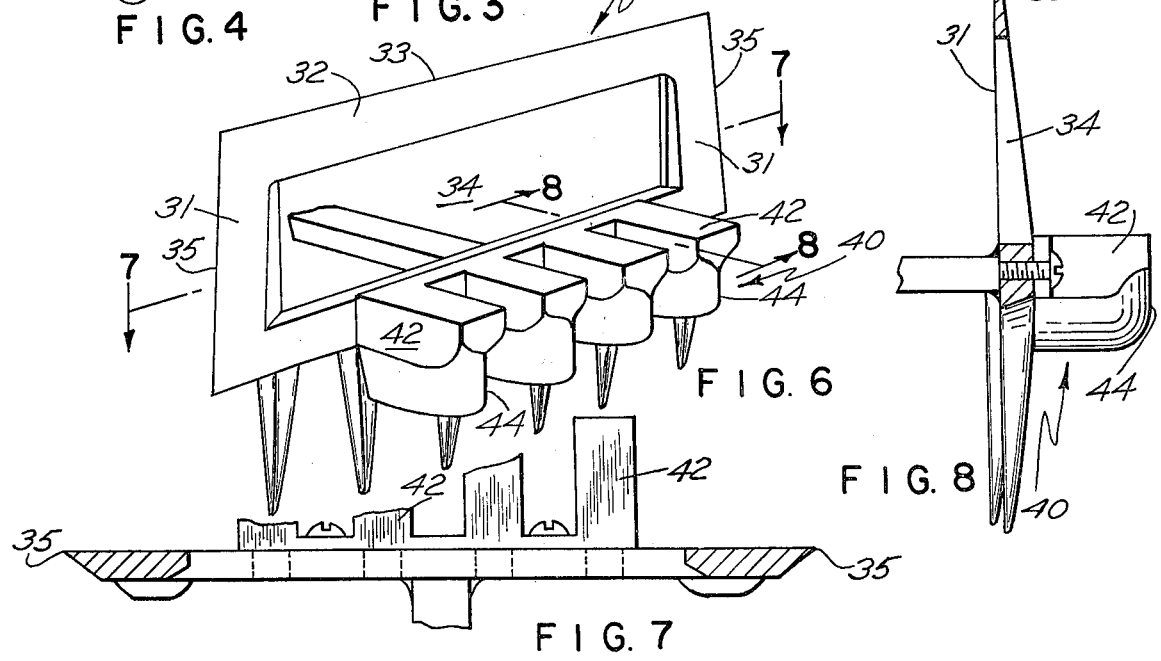
FIG. 6    FIG. 8
FIG. 7

GARDEN IMPLEMENT

BACKGROUND OF THE INVENTION

Garden implements such as rakes or hoes are designed primarily for stirring and turning the soil to prevent weed growth or leveling hills or mounds but do not have adequate cutting edges for the severance of weeds or other growth in the garden. The Gatti U.S. Pat. No. 1,666,374 represents an approach in this direction, but is not a practical tool.

SUMMARY OF THE INVENTION

A garden implement, the body of which is equipped with cutting edges at various locations along its length or at its ends, so that in the active use of the implement, weeds will be cut or the edges may be used for cutting the weeds by the use of the tines or the like with which the implement is equipped.

DESCRIPTION OF THE DRAWINGS

FIG. 1 is a perspective view of the garden implement equipped with tines such as used for a rake;

FIGS. 2, 3 and 4 are sections on line 2—2, 3—3 and 4—4 of FIG. 1;

FIG. 5 is a bottom view of the structure shown in FIG. 1 illustrating the out-of-line position of the tines which extend from the body;

FIG. 6 is a perspective view of a modified form of implement with an attachment secured thereto; and FIGS. 7 and 8 are sections on lines 7—7 and 8—8 of FIG. 6.

DESCRIPTION OF THE PREFERRED EMBODIMENT

With reference to the drawings 10 designates the rigid bar-like body of the implement which is of elongated length, substantially rectangular in cross section, the two shorter sides providing opposed upper and lower edges as at 11 and 12 which are beveled to cutting edges 13 and 14. The ends of this body terminate in wing-like portions 15 which rise above the upper cutting edge 13 and are generally flat. The wing portions 15 serve a two-fold purpose. Firstly, they will act as hillers. When the implement is drawn through the soil, the soil tends to bunch-up along the body 10, and proceeds to the outer edge to fall off the wings 15 and provide a hill of soil. Secondly, these wings are also provided with cutting edges such as upper edge 16, outer edge 17, inner edge 18 and lower edge 19, all of which are sufficiently sharp so as to cut a weed or small stock of growth if desired by manipulation of a handle 20 or tang which extends from the body 10. This handle may, of course, be provided with a longer pole-like portion for use while standing.

A plurality of tines extend from the lower edge of the body 10, there being shown in FIGS. 1 and 5 four intermediate tines 25 extending in one plane, while the end tines 26 are located in a plane offset to the rear of the tines 25 and are set further toward the handle or tang member 20 as shown in FIG. 5. In addition, the end tines are slanted inwardly toward the intermediate tines. This provides an arrangement of the tines so that the end tines 26 break out the soil as it is manipulated ahead of the main tines 25 and make it easier to pull the rake through the soil. Further, the slant on the end tines permit the implement to work close to plants without disturbing their root system. Preferably, the tines 26 are of heavier cross-section and have rounded edges to alleviate back pressure. All tines are tapered to a point at the end thereof to make it easier to move the implement through the soil. It is desirable to make the effective length of the center tines longer than the next outer and so forth, to improve the ability of the tool to be moved through the soil.

In some cases the cutting edge on the upper portion of the body may be spaced outwardly from the body as in FIG. 6. In this form the body is a generally rectangular frame-like member 30 having side arm portions 31 and bridging portions 32 between the arms forming upper and lower horizontal sides. The upper side portion 32 is beveled and sharpened as at 33 along its edge (see FIG. 8) and the center 34 is left open. The edges of the arms 31 are also beveled to provide a cutting edge 35 as seen more particularly in FIG. 7. In this form the arm portions 31 will serve a hilling function, the soil bunching up behind the body and falling off the edge 35 as the implement is drawn through the soil. When the implement of this form is used in reverse position with the portion 32 in the soil, it provides an elongated knife portion for engagement with weeds. So that furrows are not created, the center 34 will permit soil to easily pass through.

In some cases an attachment 40 may be provided with a plurality of furrowing projections 42 which are located in alignment with the tines. Each projection has a sharp leading edge 44 so that when the handle is held in a vertical attitude, the implement may be drawn through the soil in the direction of the tines, and create small ridges in the soil which will inhibit erosion during rainfall. This is also desirable to expose more soil particles and inhibit weed growth.

I claim:

1. A garden implement comprising: a rigid elongated body of generally rectangular cross section, the shorter sides thereof providing a pair of opposed upper and lower edges, and a tang connection (20) to a handle extending away from a longer side of said body, tapered tines (25) extending in a common plane from the lower edge of said backbone body at horizontally spaced locations from each other along the length of said body, said body beveled to a cutting edge (14) in the spaces separating said tines, the horizontal opposite upper edge of said backbone body beveled to a cutting edge (13), tines (26) adjacent each end of the body located in a plane offset to the rear of the tines (25) toward the tang and slanted inward with the tapered tip of each tine (26) directed toward the other tines, the ends of said body terminating in wing portions (16), (18) rising above and from the upper horizontal cutting edge (13) near each end of said body and outer end portions (17) and (19), each wing comprising upper sharp edge (16), an inner inclined sharp edge (18) connecting edge (16) and edge (13) of the body, and an outer end portion having a sharp edge (17) and lower sharp edge (19).

2. A garden implement comprising: a rigid elongated generally vertical rectangular body (30) having an opening (34) defined within, said opening defining separate opposite side arms and longer horizontal upper and lower sides, and outer edges associated with each horizontal side and each opposite side arm; tapered tines (25) extending in a common plane from the lower outer edge of said lower horizontal side at horizontally spaced locations from each other, a tang connection (20) to a handle extending substantially perpendicular with respect to tines (25) from said lower horizontal side; said lower and upper horizontal outer edges beveled to cutting edges; tines (26) adjacent each side arm extending from the lower outer edge of said lower horizontal side located in a plane to the rear of the other tines (25) toward the tang and slanted inward with the tapered tip of each tine (26) directed inward toward the other tines (25); the outer edges (35) of the side arms beveled to sharp cutting edges; said opening (34) extending substantially the distance between tines (26) to reduce resistance when pulling the implement through soil; and said implement including a plurality of substantially horizontally spaced projections (42) extending substantially perpendicular with respect to the tines (25) from a surface of said lower horizontal side opposite the tang connection (20).

* * * * *